United States Patent
Oishi

(10) Patent No.: US 10,948,588 B2
(45) Date of Patent: Mar. 16, 2021

(54) SYNTHETIC-APERTURE RADAR DEVICE

(71) Applicant: MITSUBISHI ELECTRIC CORPORATION, Tokyo (JP)

(72) Inventor: Noboru Oishi, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 240 days.

(21) Appl. No.: 16/313,723

(22) PCT Filed: Aug. 1, 2016

(86) PCT No.: PCT/JP2016/072475
§ 371 (c)(1),
(2) Date: Dec. 27, 2018

(87) PCT Pub. No.: WO2018/025300
PCT Pub. Date: Feb. 8, 2018

(65) Prior Publication Data
US 2019/0235070 A1 Aug. 1, 2019

(51) Int. Cl.
*G01S 13/90* (2006.01)
(52) U.S. Cl.
CPC .......... *G01S 13/9021* (2019.05); *G01S 13/90* (2013.01)
(58) Field of Classification Search
CPC ... G01S 13/90; G01S 13/9021; G01S 13/9094
See application file for complete search history.

(56) References Cited

U.S. PATENT DOCUMENTS 4,924,229 A * 5/1990 Eichel ................. G01S 13/9019
342/25 E
7,145,498 B2 * 12/2006 Cho ....................... G01S 13/904
342/25 R
(Continued)

FOREIGN PATENT DOCUMENTS

JP 2007-256058 A 10/2007
JP 2008-256446 A 10/2008
(Continued)

OTHER PUBLICATIONS

European Office Action for European Application No. 16911561.5, dated Sep. 10, 2020.
Câmara de Macedo et al., "Precise topography- and aperture-dependent motion compensation for airborne SAR," IEEE Geosci. Remote Sens. Letters, Apr. 2005, vol. 2, No. 2, pp. 172-176.
(Continued)

*Primary Examiner* — Peter M Bythrow
(74) *Attorney, Agent, or Firm* — Birch, Stewart, Kolasch & Birch, LLP

(57) ABSTRACT

A synthetic-aperture radar device of the present invention is the one having: a focal point information storing unit storing a plurality of pieces of focal point information determining positions of focal points; an image reproducing unit reproducing each radar image corresponding to the plurality of pieces of focal point information stored in the focal point information storing unit from a reception signal of a radio wave applied from a moving platform to an observation target and reflected by the observation target; an index calculating unit calculating an index representing an image forming state of the radar image reproduced by the image reproducing unit for each predetermined area; and a synthesizing unit synthesizing the plurality of radar images on the basis of the index calculated from each of the plurality of radar images, enabling obtaining a clear radar image without using positional information of the observation target.

12 Claims, 6 Drawing Sheets

(56) References Cited

U.S. PATENT DOCUMENTS

| | | | |
|---|---|---|---|
| 7,236,646 B1* | 6/2007 | Horne | G06T 5/40 |
| | | | 382/103 |
| 10,495,750 B1* | 12/2019 | Musgrove | G01S 13/904 |
| 10,591,582 B1* | 3/2020 | Musgrove | G01S 13/90 |
| 2010/0086228 A1 | 4/2010 | Cho et al. | |
| 2015/0061927 A1 | 3/2015 | Jin | |
| 2017/0061217 A1* | 3/2017 | Cha | G06K 9/6212 |
| 2019/0235070 A1* | 8/2019 | Oishi | G01S 13/90 |

FOREIGN PATENT DOCUMENTS

| | | |
|---|---|---|
| JP | 2011-112630 A | 6/2011 |
| JP | 4749903 B2 | 8/2011 |
| JP | 2015-148452 A | 8/2015 |
| JP | 2015-529800 A | 10/2015 |
| WO | WO 2008/021374 A2 | 2/2008 |
| WO | WO 2014/011287 A2 | 1/2014 |

OTHER PUBLICATIONS

Hirosawa, "Reduction of Speckle in One-Look Synthetic Aperture Radar Images", Journal of the Institute of Electronics, Information and Communication Engineers, 1992, vol. J75-B-II, No. 3, pp. 197-200.

International Search Report, issued in PCT/JP2016/072475, dated Oct. 18, 2016.

Japanese Office Action for Japanese Patent Application No. 2016-570067, dated Apr. 4, 2017.

Oishi, et al. "A Proposal for a Goast Detection Method Based on Blurred Area in SAR images" Proceedings of the 2010 IEICE General Conference, Mar. 2010, Tohoku Univ., Sendai.

Ouchi, "Principles of Synthetic Aperture Radar for Remote Sensing," 2nd edition, Tokyo Denkin University Press, Jun. 20, 2009, pp. 166 to 167, 210 to 217.

Reigber et al., "Very-high-resolution airborne synthetic aperture radar imaging: Signal processing and applications," Proc. IEEE, Mar. 2013, vol. 101, No. 3, pp. 759-783.

* cited by examiner

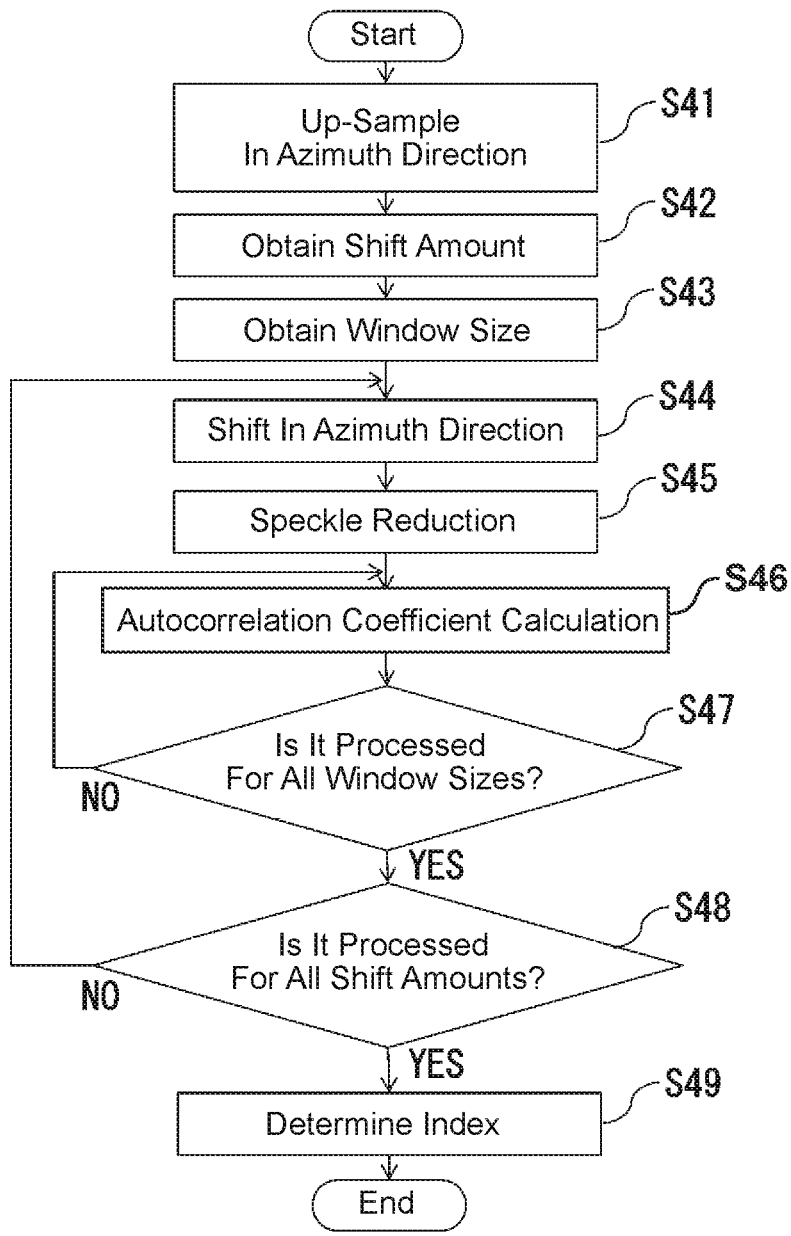

SYNTHETIC-APERTURE RADAR DEVICE

TECHNICAL FIELD

The present invention relates to a synthetic-aperture radar device mounted on a movable platform, which observes a ground surface and the like.

BACKGROUND ART

A synthetic-aperture radar (SAR) device repeatedly irradiates an observation target with pulsed waves of radio waves from a SAR sensor mounted on a moving platform such as an aircraft and an artificial satellite, receives a reflected wave from the observation target, and reproduces an SAR image on the basis of positional information of the platform and of the observation target at the time of transmission/reception and a reception signal of the reflected wave. In a case where the positional information of the platform and the observation target is inaccurate, the reproduced SAR image is blurred mainly in an azimuth direction (platform traveling direction, direction orthogonal to sight line direction from SAR sensor to observation target, cross range direction). The positional information of the platform may be obtained by a global positioning system (GPS) receiver, an inertial measurement unit (IMU) or the like, but the position of the observation target may be unknown. Therefore, the position of the observation target has been conventionally obtained by using a digital elevation model (DEM) obtained by another sensor or another observation opportunity (for example, Non-Patent Literature 1).

CITATION LIST

Non-Patent Literature

Non-Patent Literature 1: K. A. Camara de Macedo, R. Scheiber, "Precise topography- and aperture-dependent motion compensation for airborne SAR," IEEE Trans. Geosci. Remote Sens. Letters, vol. 2, no. 2, pp. 172-176, April 2005.

SUMMARY OF INVENTION

Technical Problem

Since the conventional synthetic-aperture radar device is based on the assumption that there is the DEM of an observation area, in the absence of the DEM of the observation area, it is forced to reproduce the radar image supposing existence of a plane surface, and the observation target in a position deviated from the supposed plane surface is problematically blurred in the azimuth direction.

Also, even when there is the DEM, for example, an artificial structure and the like constructed between the time of DEM creation and the time of SAR observation is problematically blurred in the azimuth direction because the information used for reproducing the radar image is not included in the DEM. Similarly, as also for a moving object in the observation area, since the positional information for each observation time is not included in the DEM and is unknown, this is problematically blurred in the azimuth direction.

The present invention is achieved to solve the above-described problem, and an object thereof is to obtain a radar image formed without blur without using the positional information of the observation target such as that of the DEM.

Solution to Problem

A synthetic-aperture radar device according to the present invention is a synthetic-aperture radar device provided with: an image reproducing unit for reproducing a plurality of radar images each corresponding to a plurality of pieces of focal point information determining a position of a focal point from a reception signal of a radio wave applied from a moving platform to an observation target and reflected by the observation target, an index calculating unit for setting a predetermined area in the plurality of radar images reproduced by the image reproducing unit and calculating an index representing an image forming state for each area of the plurality of radar images using an amplitude value of each of the radar images or an autocorrelation coefficient calculated on the basis of a power value calculated from the amplitude value; and a synthesizing unit for synthesizing corresponding pixel values of the plurality of radar images on the basis of the index calculated for each area of the plurality of radar images to generate one radar image.

Advantageous Effects of Invention

According to the present invention, with the above-described configuration, it is possible to obtain a clear radar image without using the positional information of the observation target such as that of the DEM.

BRIEF DESCRIPTION OF DRAWINGS

FIG. 4 is a flowchart illustrating operation of index calculation of the synthetic-aperture radar device according to the first embodiment of the present invention.

DESCRIPTION OF EMBODIMENTS

The present invention relates to a synthetic-aperture radar device which reproduces a radar image from a reception signal obtained by receiving a radio wave applied from a moving platform and reflected by an observation target, especially characterized in calculating an index representing an image forming state of the image in each of a plurality of radar images reproduced corresponding to a plurality of pieces of focal point information and generating a multifocal radar image obtained by synthesizing a plurality of radar images on the basis of the calculated indices.

Hereinafter, an embodiment of the present invention is described below with reference to the drawings. Note that, in each drawing, the same reference sign is assigned to the same or similar components.

First Embodiment

Figure 1:
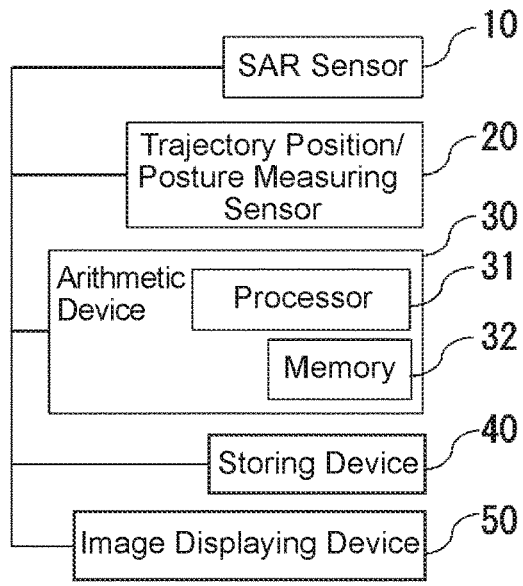
FIG. 1 is a block diagram illustrating a hardware configuration of a synthetic-aperture radar device according to a first embodiment of the present invention.

FIG. 1 is a block diagram illustrating an example of a hardware configuration of a synthetic-aperture radar device 1 according to an embodiment of the present invention. In the drawing, the synthetic-aperture radar device 1 is provided with an SAR sensor 10, a trajectory position/posture measuring sensor 20, an arithmetic device 30, a storing device 40, and an image displaying device 50.

The SAR sensor 10 is a device formed from an SAR antenna, a transceiver, an analog/digital converter and the like (none of them is illustrated). The SAR sensor 10 is mounted on a moving platform, radiates a pulsed wave of a radio wave from the SAR antenna, and receives the radio wave reflected by an observation target with the SAR antenna. A reception signal received by the SAR antenna is subjected to signal processing by the transceiver and then converted to a digital signal by the analog/digital converter to be output.

The trajectory position/posture measuring sensor 20 is a device formed from a GPS receiver, a GPS antenna, an IMU and the like. The trajectory position/posture measuring sensor 20 is mounted on the moving platform and measures a trajectory position and posture of the platform to output.

The arithmetic device 30 is formed from a processor 31 including a central processing unit (CPU), a graphics processing unit (GPU) and the like, and a memory 32. The arithmetic device 30 reproduces an image from the reception signal output from the SAR sensor 10 to output. A program in which necessary processing is described is stored in the memory 32, and the processor 31 executes the program stored in the memory 32, thereby implementing a process of reproducing the image.

The storing device 40 is a hard disk or the like. The storing device 40 stores images, parameters and the like.

The image displaying device 50 is a display or the like. On the image displaying device 50, the image reproduced by the arithmetic device 30 is displayed.

Figure 2:
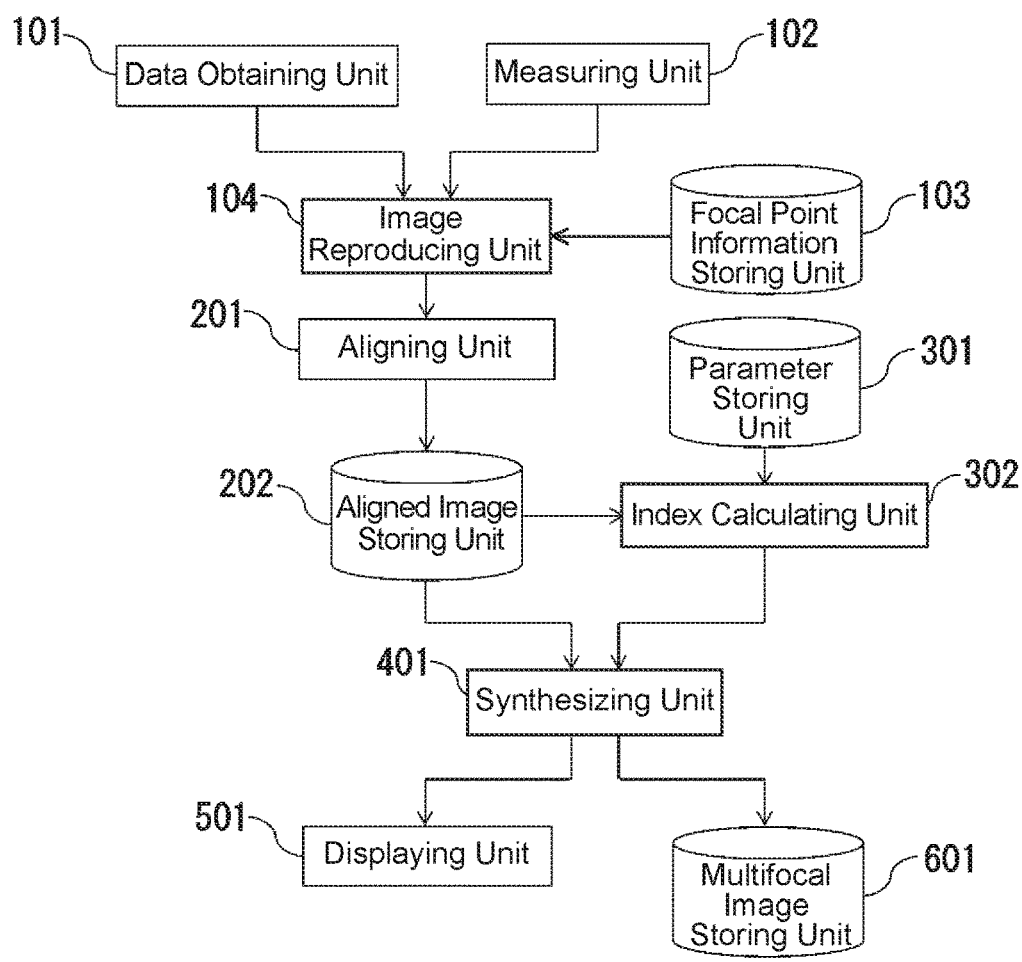
FIG. 2 is a functional configuration diagram illustrating a configuration of the synthetic-aperture radar device according to the first embodiment of the present invention.

FIG. 2 is a functional configuration diagram illustrating a configuration of the synthetic-aperture radar device 1 according to the first embodiment of the present invention. In the drawing, the synthetic-aperture radar device 1 is provided with a data obtaining unit 101, a measuring unit 102, a focal point information storing unit 103, an image reproducing unit 104, an aligning unit 201, an aligned image storing unit 202, a parameter storing unit 301, an index calculating unit 302, a synthesizing unit 401, a displaying unit 501, and a multifocal image storing unit 601.

The data obtaining unit 101 corresponds to the SAR sensor 10 illustrated in FIG. 1. The data obtaining unit 101 is mounted on the platform and outputs sensor information such as a repetitive period of transmission and reception of the pulsed wave and pulse transmission/reception time together with the reception signal of the reflected wave obtained by repeatedly transmitting and receiving the pulsed wave.

The measuring unit 102 corresponds to the trajectory position/posture measuring sensor 20 illustrated in FIG. 1. The measuring unit 102 measures information regarding the trajectory position/posture of the platform, for example, a position of the platform represented by latitude, longitude, height and the like, a posture of the platform represented by a roll angle, a pitch angle, a yaw angle, a speed, acceleration and the like at regular intervals or unequal intervals to output. The position of the platform may be represented in a coordinate system fixed on the earth or a local coordinate system specific to the platform.

The focal point information storing unit 103 corresponds to the storing device 40 illustrated in FIG. 1 and stores a plurality of pieces of focal point information determining the position of the focal point. The focal point information is information required for reproducing such as altitude focused on when reproducing the image, or the latitude, longitude, and altitude of the focal point.

The image reproducing unit 104 corresponds to the arithmetic device 30 illustrated in FIG. 1 to which the reception signal and sensor information output from the data obtaining unit 101, the information regarding the trajectory position/posture output from the measuring unit 102, and a plurality of pieces of focal point information read from the focal point information storing unit 103 are input reproduces the images for each focal point information to output. That is, in a case where two pieces of focal point information are stored in the focal point information storing unit 103, two images are reproduced from the same reception signal on the basis of the respective pieces of focal point information to be output. For example, a synthetic-aperture radar image, an inverse synthetic-aperture radar image, a SAR tomographic image, a circular SAR image and the like correspond to the image reproduced for each focal point information. Note that, in the following, these images are collectively referred to as "radar images". Also, the image reproduced on the basis of each focal point information is also referred to as "image for each focal point information" or "image for each focal point".

The aligning unit 201 corresponds to the arithmetic device 30 illustrated in FIG. 1 to which the images reproduced for the respective pieces of focal point information by the image reproducing unit 104 are input aligns the images such that corresponding positions of the respective images overlap with each other and outputs the aligned image.

The aligned image storing unit 202 corresponds to the storing device 40 illustrated in FIG. 1 and stores a plurality of images output from the aligning unit 201.

The parameter storing unit 301 corresponds to the storing device 40 illustrated in FIG. 1 and stores a parameter such as an azimuth direction shift amount to be used in the index calculating unit 302 to be described later.

The index calculating unit 302 corresponds to the arithmetic device 30 in FIG. 1 to which the parameter stored in the parameter storing unit 301 and the image for each focal point information stored in the aligned image storing unit 202 are input calculates an index for evaluating an image forming state of the image reproduced by the image reproducing unit 104, in other words, an index indicating whether the image is blurred or clear for each predetermined area set in the image to output. A size of the area is set to one pixel by one pixel or larger.

The synthesizing unit 401 corresponds to the arithmetic device 30 illustrated in FIG. 1 to which the images for the respective pieces of focal point information stored in the aligned image storing unit 202 and the index output from the index calculating unit 302 are input generates one multifocal image by synthesizing the images for the respective pieces of focal point information on the basis of the index calculated in the image for each focal point information to output.

The displaying unit 501 corresponds to the image displaying device 50 illustrated in FIG. 1 and displays the multifocal image generated by the synthesizing unit 401.

The multifocal image storing unit 601 corresponds to the storing device 40 illustrated in FIG. 1 and stores the multifocal image generated by the synthesizing unit 401.

Note that, although a configuration in which the data obtaining unit 101 (SAR sensor 10), the measuring unit 102 (trajectory position/posture measuring sensor 20), the displaying unit 501 (image displaying device 50), and the multifocal image storing unit 601 are included in the synthetic-aperture radar device 1 is described in this embodiment, this is not limited thereto, and a configuration in which some or all of them are provided outside the synthetic-aperture radar device 1 separately from the synthetic-aperture radar device 1 is also possible.

Next, operation of the synthetic-aperture radar device 1 is described with reference to a flowchart.

Figure 3:
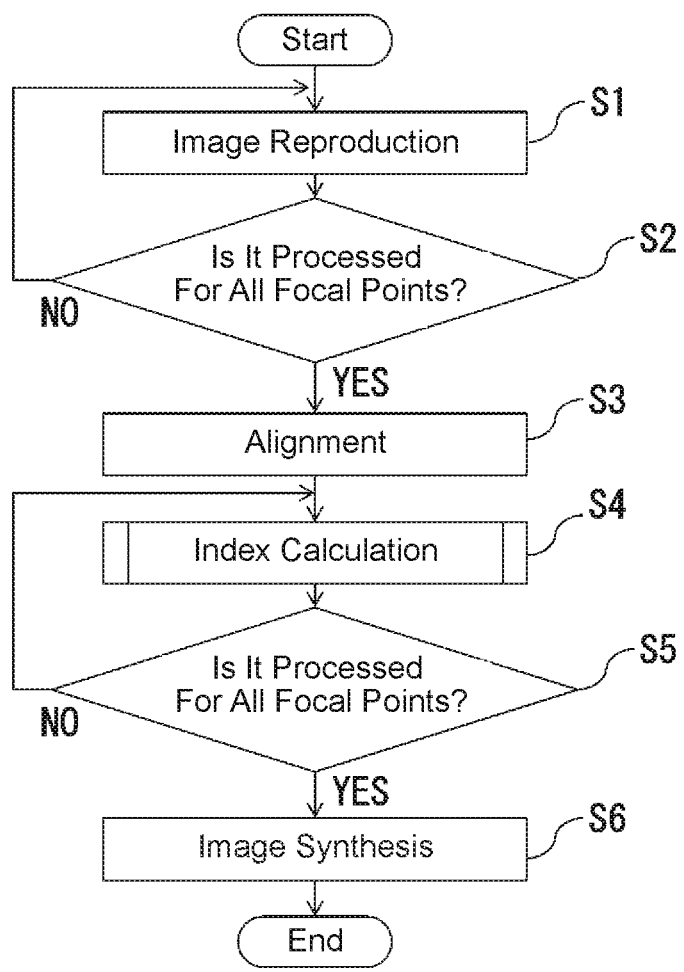
FIG. 3 is a flowchart illustrating operation of the synthetic-aperture radar device according to the first embodiment of the present invention.

FIG. 3 is the flowchart illustrating the operation of the synthetic-aperture radar device 1 according to the first embodiment. Hereinafter, as an example, a case where a multifocal SAR image is generated using a plurality of SAR images reproduced corresponding to a plurality of pieces of focal point information is described.

At step S1, the image reproducing unit 104 reproduces the SAR image on the basis of the reception signal output from the data obtaining unit 101, the positional information of the platform output from the measuring unit 102, and the focal point information stored in the focal point information storing unit 103. Since two or more focal points of the image are determined by the focal point information stored in the focal point information storing unit 103, the image reproducing unit 104 reproduces the SAR images corresponding to the respective focal points. Examples of an image reproducing method include a range Doppler method, a chirp scaling method, a ω-K method, a polar format method, and a back-projection method, for example.

Regarding the focal point, for example, as in Non-Patent Literature 2, a focal plane may be determined for each predetermined height such as altitudes of 0 m, 100 m, and 200 m. In this case, by correcting a phase and reception timing of a signal of a reflected wave on the basis of the respective heights, it is possible to reproduce the image for each focal point. Also, for example, as in Patent Literature 1, a lattice point set at every 50 m in a horizontal direction within an observation area may be set as a focal position. In this case, by correcting a phase and reception timing of a signal of a reflected wave on the basis of a position of each lattice point, it is possible to reproduce the image for each focal point. Furthermore, for example, it is possible that: each lattice point is determined as a focal position; first, an image reproduced focusing on one focal point A is made an image A; and then images B, C, . . . focal points of which are changed are generated by an autofocusing process for correcting the image A such that images around the positions of other focal points B, C, . . . are formed.

Non-Patent Literature 2: A. Reigber, R. Scheiber, M. Jager, P. Prats-Iraola, I. Hajnsek, T. Jagdhuber, K. P Papathanassiou, M. Nannini, E. Aguilera, S. Baumgartner, R. Horn, A. Nottensteiner, and A. Moreira, "Very-high-resolution airborne synthetic aperture radar imaging: Signal processing and applications," Proc. IEEE, vol. 101, no. 3, pp. 759-783, March 2013.

Patent Literature 1: Japanese Patent Application Laid-Open No. 2007-256058

At step S2, the image reproducing unit 104 determines whether an image reproducing process is executed for all pieces of focal point information. In a case where there is the focal point information on which the image reproducing process is not executed, the procedure returns to step S1 to execute the image reproducing process. In a case where the image reproducing process is executed for all the focal points, the procedure proceeds to step S3.

At step S3, the aligning unit 201 executes an aligning process such that the same observation target is located in the same pixel in a plurality of SAR images reproduced for the respective focal points at step S1. Although a plurality of SAR images is reproduced from the same reception signal, because of different focal points, correction amounts of the phase and distance for the reception signal are different, and there is image deviation for each focal point. In the aligning process, for example, the aligning unit 201 determines one image as a reference image (master image) and measures a deviation amount between another image (slave image) and the master image by calculating a cross-correlation coefficient between images and the like and resamples the slave image such that the deviation disappears. The SAR image for each focal point after the alignment is stored in the aligned image storing unit 202.

Next, at step S4, the index calculating unit 302 calculates an index for evaluating an image forming state of the image for each SAR image after the alignment. The index is a numerical value of a degree of image formation or a degree of blurring of the SAR image and is determined one for each pixel or for each predetermined area including a plurality of pixels. As the index, for example, an autocorrelation coefficient, an autocorrelation function, entropy, standard deviation and the like of the image may be used.

At step S5, the index calculating unit 302 determines whether an index calculating process is executed for all the focal points. In a case where there is a focal point on which the index calculating process is not executed, the procedure returns to step S4 and the index calculating process is executed. In a case where the index calculating process is executed for all the focal points, the procedure proceeds to step S6.

Herein, the index calculating process at step S4 is described in detail with reference to a flowchart.

FIG. 4 is the flowchart illustrating operation of index calculation. In the following, a case is described in which the index is calculated using the autocorrelation coefficient and only the image forming state in an azimuth direction is evaluated. Also, a case where an index representing a degree of image formation in the azimuth direction is calculated for each pixel is described. The autocorrelation coefficient becomes larger as the image is more blurred and becomes smaller as the image is clearer. Note that a reason for which the autocorrelation coefficient may be used as an evaluation index of the image forming state of the image is to be described later.

At step S41, the index calculating unit 302 up-samples the SAR image in the azimuth direction.

A reason for sampling the SAR image is described with reference to the drawings.

Figure 5A:
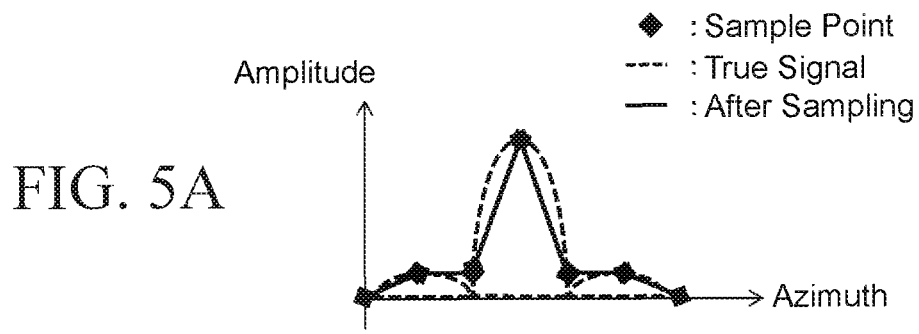
FIG. 5 is views illustrating an example of sampling of an SAR image.
Figure 5B:
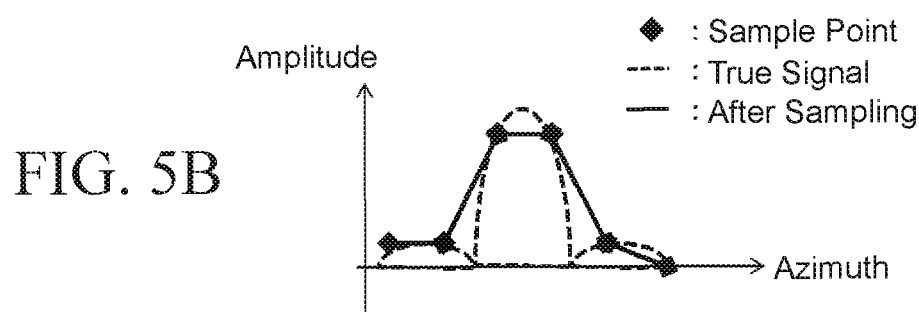

FIG. 5 is views illustrating an example of sampling of the SAR image. In the drawing, broken line indicates amplitude of a true signal of the SAR image, and solid line connecting sample points sampled from the true signal with a straight line indicates amplitude of the signal after sampling. In examples illustrated in FIG. 5A and FIG. 5B, an amplitude shape of the true signal is the same but the amplitude shapes after the sampling are different. Specifically, the amplitude shape after the sampling in FIG. 5A seems to have a sharper peak compared with the amplitude shape after the sampling in FIG. 5B, due to difference in position of the sample points. In order to prevent such difference in amplitude shape due to the position to be sampled, the index calculating unit 302 obtains an image close to the true amplitude shape of the signal by up-sampling the SAR image in the azimuth direction. An up-sampling rate is set to the same magnification or larger. As a method of up-sampling, for example, a method of performing Fourier transform on the SAR image in the azimuth direction, zero-padding both ends of a signal band, and performing inverse Fourier transform in the azimuth direction and the like is known.

Next, at step S42, the index calculating unit 302 obtains the shift amount used when calculating a local autocorrelation coefficient of the image from the parameter storing unit 301. Note that although it is described that the shift amount is stored in advance in the parameter storing unit 301, this is not limited thereto, and the shift amount may also be calculated each time each multifocal image is reproduced.

Next, at step S43, the index calculating unit 302 obtains a window size used when calculating the local autocorrelation coefficient of the image from the parameter storing unit 301. Note that, also as for the window size, an optimum window size may be calculated for each image. A method of calculating the shift amount and the window size is described later in detail.

At step S44, the index calculating unit 302 reads the image stored in the aligned image storing unit 202 and shifts the image in the azimuth direction in order to calculate the autocorrelation coefficient. The shift amount is selected from the value stored in the parameter storing unit 301 in advance and one or more shift amounts determined on the basis of a maximum value of the shift amount calculated at step S42.

The shift of the image in the azimuth direction corresponds to change of the sample points illustrated in FIG. 5. In addition, in a case of shifting by a certain amount, the deviation between the shifted signal and the signal not shifted is relatively smaller as spread of the signal is larger, so that the autocorrelation coefficient does not decrease. However, the spread of the signal varies not only by the degree of image blurring but also by a size of the observation target.

Therefore, the index calculating unit 302 may evaluate the degree of image formation by various sample points (amplitude shape after the sampling illustrated in FIG. 5) by calculating a final autocorrelation coefficient from the autocorrelation coefficient calculated using two or more shift amounts. As a result, as with the effect of up-sampling at step S41, it is possible to alleviate an influence of difference between the true amplitude shape and the amplitude shape after the sampling on a calculation result of the autocorrelation coefficient.

Next, at step S45, the index calculating unit 302 reduces speckles of the SAR image. The speckle is fluctuation of an amplitude value of the image such as multiplicative noise generated when reflected waves from reflectors interfere with each other in a case where there is a plurality of reflectors in the observation area. As a method of reducing the speckles, for example, moving average of image, a Hirosawa filter (Non-Patent Literature 3) and the like are known. In these methods, since pixel values are locally averaged, the speckles are suppressed, and resolution of the image is lowered. When azimuth resolution decreases, image formation in the azimuth direction cannot be accurately evaluated, so that in a speckle reducing process at step S45, the pixel values are averaged only in a range direction such that the azimuth resolution is not lowered.

Non-Patent Literature 3: Haruto Hirosawa, "Reduction of Speckle in One-Look Synthetic-Aperture Radar Image", Journal of the Institute of Electronics, Information and Communication Engineers, Vol. J75-B-II, No. 3, pp. 197-200 (1992)

At step S46, the index calculating unit 302 selects the window size from the window sizes stored in advance in the parameter storing unit 301 or one or more window sizes determined on the basis of a maximum value of the window size calculated at step S43.

Thereafter, on the basis of a selected window size Wa and a shift amount Δa in the azimuth direction selected at step S44, the index calculating unit 302 calculates the autocorrelation coefficient for each pixel position (a, r) from the image read from the aligned image storing unit 202 and the image shifted at step S44. The autocorrelation coefficient is calculated on the basis of the amplitude value or a power value of each pixel of the SAR image. An autocorrelation coefficient $\gamma(a,r,\Delta a,Wa)$ calculated on the basis of an amplitude value $Pj(a,r)$ of the SAR image is obtained by, for example, equation (1) or equation (2). Equation (1) corresponds to the autocorrelation coefficient in a case where the number of pixels Wr of the window size in the range direction of equation (2) is 1. Note that a suffix j of the amplitude value Pj is a numeric value set for each image at each focal point and j=1, 2, . . . , N (N is the number of set focal points).

[Equation 1]

$$\gamma(a, r, \Delta a, W_a) = \frac{\sum_{p=-W_a/2}^{W_a/2} |w(p)P_j(a+p, r)||w(p)P_j(a+\Delta a+p, r)|}{\sqrt{\sum_{p=-W_a/2}^{W_a/2} |w(p)P_j(a+p, r)|^2 \sum_{p=-W_a/2}^{W_a/2} |w(p)P_j(a+\Delta a+p, r)|^2}} \quad (1)$$

a: azimuth position of pixel

γ: range position of pixel

Δa: azimuth shift amount $W_a$: azimuth pixel number used in calculation of autocorrelation (window size of correlation calculation)

w(p): weight coefficient j: numeric value set for each image of each focal point, j=1, 2, . . . , N (N is number of set focal points)

$p_j(a,r)$: pixel value of coordinate (a,r) of SAR image j

[Equation 2]

$$\gamma(a, r, \Delta a, W_a) = \frac{\sum_{q=-W_r/2}^{W_r/2} \sum_{p=-W_a/2}^{W_a/2} |w(p)P_j(a+p, r+q)| \cdot |w(p)P_j(a+\Delta a+p, r+q)|}{\sqrt{\sum_{q=-W_r/2}^{W_r/2} \sum_{p=-W_a/2}^{W_a/2} |w(p)P_j(a+p, r+q)|^2} \sqrt{\sum_{q=-W_r/2}^{W_r/2} \sum_{p=-W_a/2}^{W_a/2} |w(p)P_j(a+\Delta a+p, r+q)|^2}} \quad (2)$$

a: azimuth position of pixel
γ: range position of pixel
Δa: azimuth shift amount
$W_a$: azimuth pixel number used in calculation of autocorrelation (window size of correlation calculation)
$W_r$: range pixel number used for calculation of autocorrelation
w(p): weight coefficient
j: numeric value set for each image of each focal point, j=1, 2, . . . , N (N is number of set focal points)
$p_j(a,r)$: pixel value of coordinate (a,r) of SAR image j The autocorrelation coefficient γ(a,r,Δa,Wa) is calculated for each position a in the azimuth direction and position r in the range direction in the image, and for each shift amount Δa in the azimuth direction and window size Wa in the azimuth direction on the basis of a range of a value set as the parameter. All of weight coefficients w(p) being arbitrary values may be one, for example, or some of them may be one and others may be 0, or they may be different values for each value p. The range pixel number Wr used for calculating the autocorrelation coefficient by equation (2) is a constant stored in the parameter storing unit 301.

The autocorrelation coefficient γ(a,r,Δa,Wa) is present for each pixel of the SAR image reproduced focusing on each focal point, and there are as many coefficients as the set shift amounts Δa and window sizes Wa.

At step S47, the index calculating unit 302 determines whether a calculating process of the autocorrelation coefficient is executed for all the window sizes. In a case where there is the window size for which the calculating process of the autocorrelation coefficient is not executed, the procedure returns to step S46 to execute the calculating process of the autocorrelation coefficient. In a case where the calculating process of the autocorrelation coefficient is executed for all the window sizes, the procedure proceeds to step S48.

At step S48, the index calculating unit 302 determines whether the calculating process of the autocorrelation coefficient is executed for all the shift amounts. When there is the shift amount for which the calculating process of the autocorrelation coefficient is not executed, the procedure returns to step S44 to execute the shifting process in the azimuth direction, the speckle reducing process, and the calculating process of the autocorrelation coefficient. In a case where the calculating process of the autocorrelation coefficient is executed for all the shift amounts, the procedure proceeds to step S49.

At step S49, the index calculating unit 302 determines an index Ij(a,r) for evaluating the image forming state of the SAR image reproduced focusing on the focal point j for each pixel from a plurality of autocorrelation coefficients γ calculated while changing the shift amount and the window size. For example, the index Ij(a,r) may be a minimum value for each coordinate (a,r) of each pixel of the autocorrelation coefficient γ(a,r,Δa,Wa), that is, the minimum value of the autocorrelation coefficient γ(a,r,Δa,Wa) calculated while changing Δa and Wa, or a calculation result such as the sum, product and the like.

Figure 6A:
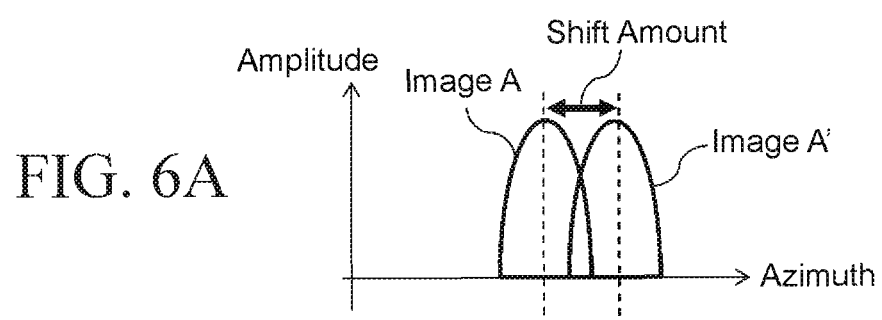
FIG. 6 is views illustrating a relationship between a degree of blurring of an image and an autocorrelation coefficient.
Figure 6B:
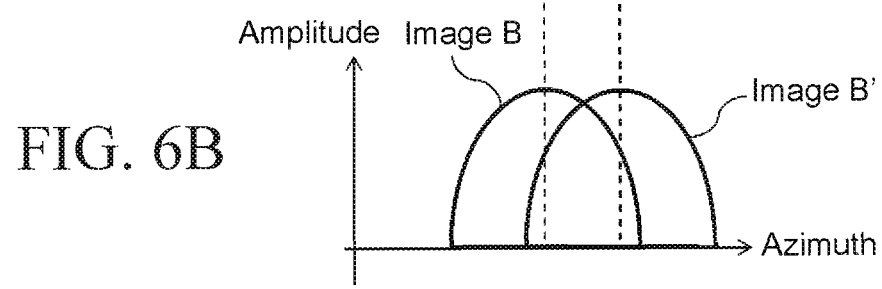

Herein, a reason for which the autocorrelation coefficient serves as the evaluation index of the image forming state of the image is described with reference to the drawings. FIG. 6 is views illustrating amplitude of a bright point in two images A and B with different blurring degrees. The image A illustrated in FIG. 6A is more clearly formed as compared with the image B illustrated in FIG. 6B. In a case of generating images A' and B' by shifting the images A and B by the same shift amount, in the image A image-formed better, the amplitudes of the bright point before and after the shift are separated from each other as compared with those of the more blurred image B. In other words, an overlap of the amplitude between the bright point before shifting and that after shifting is smaller in the image A as compared with the image B. That is, the similarity between the image A and the image A' is low and the autocorrelation coefficient is lowered. In this manner, it is possible to determine that the image is clearly formed as the autocorrelation coefficient is smaller, so that the autocorrelation coefficient may be used as the index for evaluating the image forming state of the image.

Now, return to the description of the flowchart in FIG. 3 again.

At step S6, on the basis of the index Ij(a,r) for evaluating the image formation calculated for each pixel of the image of each focal point j, the synthesizing unit 401 synthesizes the images of the focal points stored in the aligned image storing unit 202 to output one image.

Next, a process of synthesizing the image is described with reference to the drawing.

Figure 7:
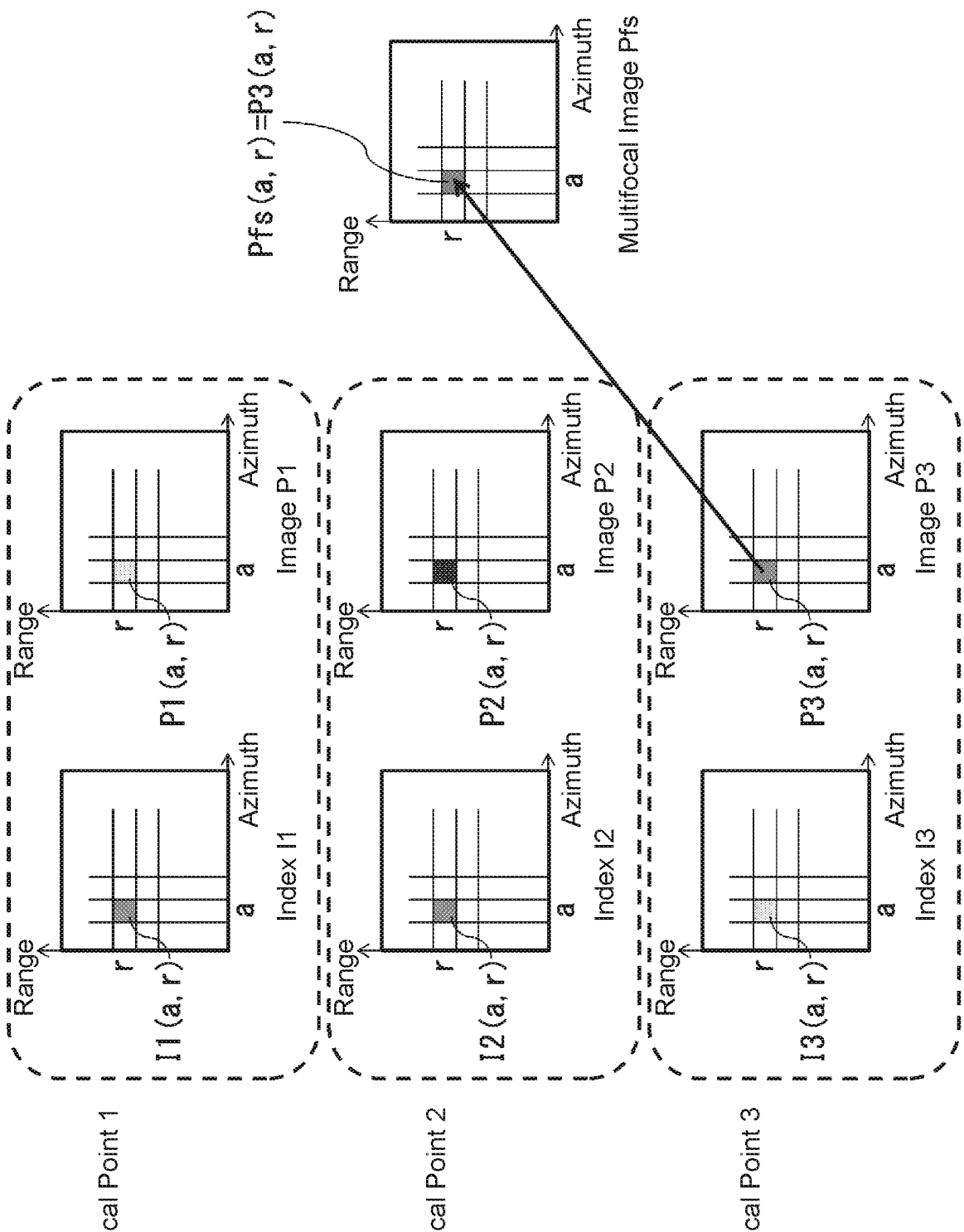
FIG. 7 is a view illustrating an image synthesizing process of the synthetic-aperture radar device according to the first embodiment of the present invention.

FIG. 7 is a view illustrating an image synthesizing process of the synthetic-aperture radar 1 according to the first embodiment. The number N of set focal points is three. Since the index Ij(a,r) is a value based on the autocorrelation coefficient, the smaller the value, the more clearly the image is formed.

The synthesizing unit 401 compares indices I1(a,r), I2(a,r), and I3(a,r) in the pixel of the same coordinate (a,r) in images P1, P2, and P3 for the respective focal points and extracts a pixel value Pj(a,r) of the image which is most formed. In the drawing, suppose that a relationship of I3(a,r)<I2(a,r)<I1(a,r) holds. In this case, the synthesizing unit 401 determines that the image P3 having the smallest index Ij(a,r) is the most image-formed and extracts the pixel value P3(a,r) of the image P3. The extracted pixel value P3(a,r) becomes a pixel value of a coordinate (a,r) of a multifocal image Pfs which is the image after synthesis. The synthesizing unit 401 compares the index among the images of the respective focal points in all the pixels (a,r) in the image, and extracts the pixel most image-formed.

Although a case where the value which becomes smaller as the image is more clearly formed such as the autocorrelation coefficient is made the index is described above, for example, the value which becomes the largest in a case where the image is most formed such as entropy may also be selected as the index. As described above, magnitude of the index in a case that image-forming is good varies depending on the value used as the index of image forming evaluation. Therefore, the synthesizing unit 401 extracts the pixel value of the pixel indicated by the index that the image is most formed and makes the same the pixel value of the multifocal image.

As the pixel value of the multifocal image, the pixel value extracted from the image of each focal point may be directly used as in FIG. 7 or a result obtained by averaging them by using the index as the weight coefficient may be used as in equation (3).

Furthermore, the pixel value of the multifocal image generated by synthesizing on the basis of the index may be a value of a complex number of the SAR image itself, the amplitude of the pixel of the SAR image, or the power value of the pixel.

[Equation 3]

$$P_{fs}(a, r) = \frac{\sum_{j=1}^{N} I_j(a, r) P_j(a, r)}{\sum_{j=1}^{N} I_j(a, r)} \quad (3)$$

$P_{fs}(a,r)$: multifocal image of coordinate (a,r)

Also, the order of a repeating process by the focal point, the shift amount, and the window size in the flowcharts in FIGS. 3 and 4 may be changed as appropriate depending on the index calculating method.

Herein, an example of the window size and the shift amount used for calculating the autocorrelation coefficient is described.

Figure 8:
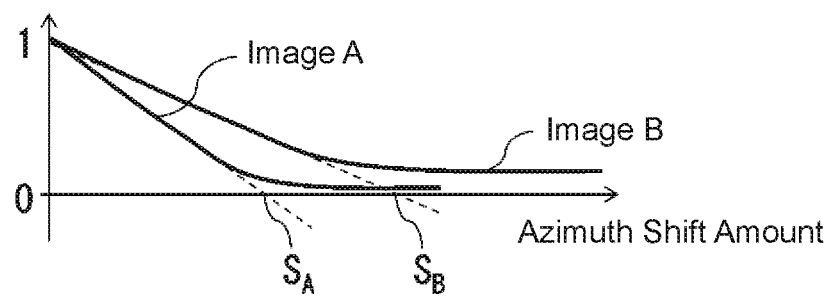
FIG. 8 is a view illustrating a method of obtaining a shift amount and a window size used for calculating the autocorrelation coefficient of the synthetic-aperture radar device according to the first embodiment of the present invention.

FIG. 8 is a view illustrating a method of calculating the shift amount and the window size. In the drawing, thick curve indicates a relationship between the shift amount in the azimuth direction and the autocorrelation coefficient calculated in the entire image. Amplitude images A and B represent the SAR images reproduced on the basis of different pieces of focal point information. Also, broken line in the drawing is an extension of the autocorrelation coefficient of a section in which the autocorrelation coefficient decreases in proportion to an increase in shift amount. In each broken line, $S_A$ and $S_B$ indicate the shift amounts when the autocorrelation coefficient becomes a predetermined value, for example, 0. Note that broken line in the drawing may be obtained by extending a straight line connecting a position at which the autocorrelation coefficient is 1 and a position at which the autocorrelation coefficient becomes 0.5 on the curve of the autocorrelation coefficient, or may be a tangent to a position where the autocorrelation coefficient is 0.6. Also, $S_A$ and $S_B$ may be obtained from the shift amount when the autocorrelation coefficient indicated by broken line is any value other than 0 or the shift amount when the curve of the autocorrelation coefficient in the drawing is a predetermined value. In the following description, broken line in the drawing indicates the autocorrelation coefficient other than a section in which the autocorrelation coefficient decreases in proportion to the increase in the shift amount, and a case of obtaining $S_A$ and $S_B$ from the shift amount when the autocorrelation coefficient indicated by broken line becomes 0 is described.

The shift amounts $S_A$ and $S_B$ when the autocorrelation coefficient becomes 0 correspond to a width of most spread signal in the images A and B (size of the largest observation target in the image such as a building). Also, since blurring of an image is more easily determined as a whole than in a part of the observation target, it is possible to accurately determine the image forming state of the image by adjusting the window size to the size of the observation target.

Therefore, it is possible to set the window size corresponding to the observation target in the image by setting the window size when calculating the autocorrelation coefficient within a range in which the width of the most spread signal out of all the amplitude images, that is, the largest value out of the shift amounts $S_A$ and $S_B$ at which the autocorrelation coefficient is 0 is the largest. Also, by calculating the autocorrelation coefficient while changing the window size within the range, it is possible to deal with the observation targets of various widths in the image.

On the other hand, it is possible to perform efficient calculation while eliminating useless calculation by setting the shift amount for calculating the autocorrelation coefficient within a range in which the smallest value out of the shift amounts $S_A$ and $S_B$ at which the autocorrelation coefficient becomes 0 is the largest value, for example. A reason for this is described below.

As described in the operation of the synthetic-aperture radar device 1, a process of calculating the autocorrelation coefficient while changing the shift amount and regarding that the image with the smallest result is the most clearly formed image in the images reproduced focused on different focal points corresponds to searching the image in which the autocorrelation coefficient becomes 0 with the smallest shift amount. Therefore, in a case where the local autocorrelation coefficient of the image A becomes 0 at a certain shift amount, it is possible to determine that the image A is most clearly formed unless the local autocorrelation coefficient of the image other than the image A is 0. On the other hand, when the local autocorrelation coefficient of the image other than that of the image A is already 0, it is possible to determine that the image in which an autocorrelation coefficient becomes 0 before that of the image A becomes 0 is most clearly formed.

On the other hand, it is known that, in a case where the local autocorrelation coefficient of the image becomes 0 in an entire area of the image, the autocorrelation coefficient of the entire image also becomes 0.

Therefore, when calculating the autocorrelation coefficient while increasing the shift amount, it is possible to determine the image which is the most clearly formed at a stage at which the autocorrelation coefficient of the entire image becomes 0 in at least one image.

As described above, it is possible to calculate in advance the largest value of the shift amount and the window size by using the autocorrelation coefficient of the entire SAR image reproduced on the basis of the different pieces of focal point information, and appropriately set the shift amount and the window size within the range not larger than the largest value.

Next, another example of the window size used for calculating the autocorrelation coefficient is described.

When calculating the autocorrelation coefficient, the larger the window size to be used, the more accurately the index that evaluates the image forming state of the image may be calculated, but spatial resolution of index distribution is deteriorated. Therefore, by using the minimum value of the autocorrelation coefficients calculated with various window sizes as an index, it is possible to calculate an accurate index while suppressing deterioration in spatial resolution. A reason for this is described with reference to the drawings.

Figure 9:
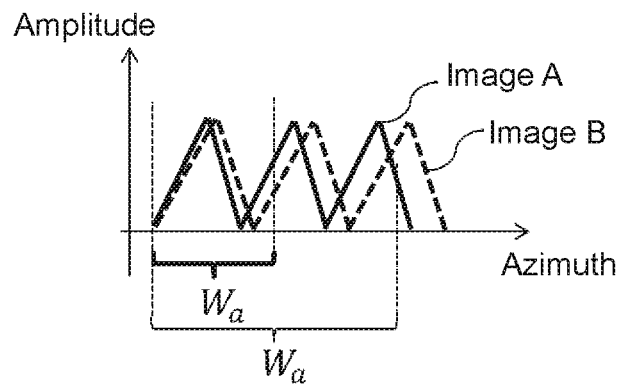
FIG. 9 is a view illustrating a relationship between an image difference and the window size used for calculating the autocorrelation coefficient.
Figure 10:
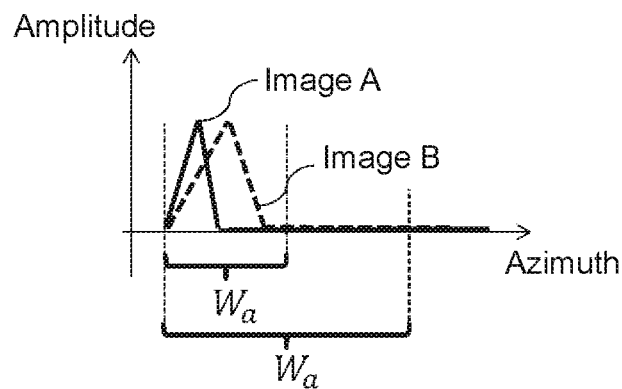
FIG. 10 is a view illustrating a relationship between the image difference and the window size used for calculating the autocorrelation coefficient.

FIGS. 9 and 10 are views illustrating a relationship between difference in amplitude shape between the images and the window size used for calculating the autocorrelation coefficient.

As illustrated in FIG. 9, when the difference between the amplitude shape of a signal of the image A and the amplitude shape of a signal of the image B is small, as the window size Wa used in the correlation calculation is larger, difference between the autocorrelation coefficient of the image A and that of the image B becomes clearer. That is, as the window size Wa increases, an error of the autocorrelation coefficient decreases, and it is possible to correctly compare the values of the autocorrelation coefficients.

On the other hand, as illustrated in FIG. 10, in a case where the signal in the image locally exists, even when the window size Wa is increased beyond the spread of the signal, no difference appears in the autocorrelation coefficient. Also, when the window size Wa is equivalent to the spread of the signal, autocorrelation of both the image A and the image B becomes the minimum. Therefore, widening the window size beyond the spread of the signal is not useful because it causes deterioration of the spatial resolution and does not change the autocorrelation coefficient. Furthermore, in a case where the amplitude does not become 0 where there is no signal due to an influence of noise, side lobes or the like, there is a danger that the autocorrelation coefficient becomes large when the window size is widened beyond the spread of the signal. Therefore, it is desirable that the window size coincides with the spread of the signal.

Also, in a case where the window size coincides with the spread of the signal, the autocorrelation coefficient becomes the minimum value, so that by calculating the autocorrelation coefficient with various window sizes and adopting the window size when the result becomes the minimum, it is possible to obtain the autocorrelation coefficient when the signal spread coincides with the window size.

As described above, the synthetic-aperture radar device of this embodiment is provided with: a focal point information storing unit for storing a plurality of pieces of focal point information determining a position of a focal point; an image reproducing unit for reproducing each of radar images corresponding to the plurality of pieces of focal point information stored in the focal point information storing unit from a reception signal of a radio wave applied from a moving platform to an observation target and reflected by the observation target; an index calculating unit for calculating an index representing an image forming state of the radar image reproduced by the image reproducing unit for each predetermined area of the radar image; and a synthesizing unit for synthesizing the plurality of radar images on the basis of the index calculated from each of the plurality of radar images, so that it is not necessary to use information obtained another observation such as that of a DEM. Therefore, it is possible to obtain the radar image formed in the entire image including an observation area without other observation information.

Also, since there is no need to make a device configuration to obtain information such as that of the DEM at the same time as observation by SAR, a device scale may be reduced, and a weight may be reduced as compared with a configuration to obtain information such as the DEM at the same time.

Also, in this embodiment, the synthetic-aperture radar device using the index for evaluating the image forming in the azimuth direction, that is, the index determined from the autocorrelation coefficient calculated by shifting the radar image only in the azimuth direction is described, this is not limited thereto, and an index for evaluating the image forming in the azimuth direction and the range direction may also be used. Note that by calculating the autocorrelation coefficient by shifting the radar image in the azimuth direction and evaluating the image formation only in the azimuth direction as in this embodiment, it is possible to reduce an amount of calculation as compared with a case of evaluating in two axes in the range direction and the azimuth direction, thereby shortening calculation time and saving power of a computer.

Also, according to this embodiment, the index calculating unit calculates the index using the amplitude value of the radar image or the power value calculated from the amplitude value. By using the amplitude value and the power value in place of the phase not including the image forming information of the image in this manner, it becomes possible to accurately calculate the index for evaluating the image forming state of the image as compared with the case of using the phase, and it is possible to obtain the multifocal image which is formed more accurately.

Also, according to this embodiment, the index calculating unit calculates the index for evaluating the image forming state on the basis of the local autocorrelation coefficient of the radar image. In this manner, by using the autocorrelation coefficient, the image formation may be accurately evaluated even when the number of pixels used for calculation is small as compared with the case of using standard deviation of the entropy, the pixel amplitude, the power value, and the like. As a result, it is possible to create a distribution map of indices with high resolution, and it is possible to obtain the multifocal image with high resolution.

Also, according to this embodiment, the index calculating unit calculates the index using the up-sampled radar image. As a result, since the difference in index of image forming evaluation due to the difference in sampled position of the image becomes small, a more accurate image forming evaluation index may be calculated, and the multifocal image formed more accurately may be obtained.

Also, according to this embodiment, the index calculating unit calculates the index of image forming evaluation with various shift amounts. As a result, as with the effect of the up-sampling, difference in index of image forming evaluation due to the difference in sampled position of the image becomes small, so that a more accurate image forming evaluation index may be calculated, and the multifocal image formed more accurately may be obtained.

Also, according to this embodiment, the index calculating unit makes the minimum shift amount out of the shift amounts when the autocorrelation coefficient calculated while changing the shift amount becomes a first predetermined value the maximum value of the shift amount in a plurality of radar images. As a result, it is possible to perform efficient calculation while eliminating useless calculation.

Also, according to this embodiment, the index calculating unit calculates the autocorrelation coefficient with various window sizes and makes the minimum value thereof the index for evaluating the image forming state of the image. As a result, it is possible to accurately calculate the autocorrelation coefficient depending on the spread of the signal of the image and to keep the resolution of the index distribution of the image forming evaluation high, so that it is possible to obtain the multifocal image with high resolution.

Also, according to this embodiment, the index calculating unit makes the maximum shift amount out of the shift amounts when the autocorrelation coefficient calculated while changing the shift amount becomes a second predetermined value the maximum value of the window size in a plurality of radar images. As a result, it becomes possible to eliminate the waste of calculating the autocorrelation coefficient with a size larger than an effective window size, so that it is possible to minimize the number of times of calculation, thereby shortening the calculation time and saving the power of the computer.

Also, according to this embodiment, the index calculating unit reduces the speckles while maintaining the resolution in the azimuth direction of the radar image. This makes it possible to reduce the speckles while maintaining the distribution of the pixel values in the azimuth direction in the image used for image formation evaluation, so that it is possible to more accurately calculate the index of the image formation evaluation and obtain the multifocal image more accurately formed as compared to a case where the conventional speckle reduction in which both range resolution and azimuth resolution degrade is used.

REFERENCE SIGNS LIST

1: Synthetic-aperture radar device, 10: SAR sensor, 20: Trajectory position/posture measuring sensor, 30: Arithmetic device, 31: Processor, 32: Memory, 40: Storing device, 50: Image displaying device, 101: Data obtaining unit, 102: Measuring unit, 103: Focal point information storing unit, 104: Image reproducing unit, 201: Aligning unit, 202: Aligned image storing unit, 301: Parameter storing unit, 302: Index calculating unit, 401: Synthesizing unit, 501: Displaying unit, 601: Multifocal image storing unit.

The invention claimed is:

1. A synthetic-aperture radar device comprising:
a processor; and
a memory that stores instructions, upon executed by the processor, causing the processor to perform a process to:
reproduce a plurality of radar images each corresponding to a plurality of pieces of focal point information determining a position of a focal point from a reception signal of a radio wave applied from a moving platform to an observation target and reflected by the observation target;
set a predetermined area in the plurality of radar images reproduced by the image reproducing unit and calculate an index representing an image forming state for each area of the plurality of radar images using an amplitude value of each of the radar images or an autocorrelation coefficient calculated on a basis of a power value calculated from the amplitude value; and
synthesize corresponding pixel values of the plurality of radar images on a basis of the index calculated for each area of the plurality of radar images to generate one radar image.

2. The synthetic-aperture radar device according to claim 1,
wherein the process includes comparing the index for each area of the plurality of radar images and synthesizing the corresponding pixel values of the plurality of radar images on a basis of a comparison result.

3. The synthetic-aperture radar device according to claim 1,
wherein the process includes calculating the index for each pixel of the radar image.

4. The synthetic-aperture radar device according to claim 1,
wherein the process includes calculating the index by using an up-sampled radar image.

5. The synthetic-aperture radar device according to claim 1,
wherein the process includes calculating the index on a basis of autocorrelation coefficients calculated with a plurality of shift amounts.

6. The synthetic-aperture radar device according to claim 5,
wherein the index is a minimum value, a sum, or a product of the autocorrelation coefficients calculated with a plurality of shift amounts.

7. The synthetic-aperture radar device according to claim 1,
wherein the process includes setting a shift amount in a range in which a minimum shift amount out of the shift amounts when the autocorrelation coefficient calculated while changing the shift amounts becomes a first predetermined value is a maximum value in the plurality of radar images.

8. The synthetic-aperture radar device according to claim 1,
wherein the process includes calculating the autocorrelation coefficient while shifting the radar image in an azimuth direction.

9. The synthetic-aperture radar device according to claim 1,
wherein the process includes calculating the index on a basis of the autocorrelation coefficients calculated with a plurality of window sizes.

10. The synthetic-aperture radar device according to claim 9,
wherein the index is a minimum value, a sum, or a product of the autocorrelation coefficients calculated with a plurality of window sizes.

11. The synthetic-aperture radar device according to claim 1,
wherein the process includes setting a window size in a range in which a maximum shift amount out of the shift amounts when the autocorrelation coefficient calculated while changing the shift amounts becomes a second predetermined value is a maximum value in the plurality of radar images.

12. The synthetic-aperture radar device according to claim 1,
wherein the process includes calculating the index by using the radar image in which resolution in the azimuth direction is maintained and speckles are reduced.

* * * * *